United States Patent [19]

Sandborg et al.

[11] Patent Number: 5,758,299

[45] Date of Patent: May 26, 1998

[54] METHOD FOR GENERATING PERFORMANCE RATINGS FOR A VEHICLE OPERATOR

[75] Inventors: Thomas R. Sandborg, Mapleton; David R. Schricker, Princeville; Mark E. Rettig, Peoria, all of Ill.

[73] Assignee: Caterpillar Inc., Peoria, Ill.

[21] Appl. No.: 552,902

[22] Filed: Nov. 3, 1995

[51] Int. Cl.$^6$ .................................. G06F 19/00
[52] U.S. Cl. ...................... 701/29; 701/35; 340/439
[58] Field of Search ............... 364/424.034, 424.04, 364/551.01; 340/438, 439, 456; 701/29, 35

[56] References Cited

U.S. PATENT DOCUMENTS

| | | | |
|---|---|---|---|
| 4,188,618 | 2/1980 | Weisbart | 364/424.04 |
| 4,258,421 | 3/1981 | Juhasz et al. | 364/424.04 |
| 5,250,761 | 10/1993 | Koyanagi | 364/424.04 |
| 5,303,163 | 4/1994 | Ebaugh et al. | 364/424.34 |
| 5,309,139 | 5/1994 | Austin | 364/424.04 |
| 5,394,136 | 2/1995 | Lammers et al. | 364/424.04 |
| 5,416,700 | 5/1995 | Bates | 340/456 |
| 5,499,182 | 3/1996 | Ousborne | 364/424.04 |
| 5,548,536 | 8/1996 | Ammon | 364/424.034 |
| 5,581,464 | 12/1996 | Woll et al. | 364/424.04 |
| 5,600,558 | 2/1997 | Mearek et al. | 364/424.04 |

Primary Examiner—Gary Chin
Attorney, Agent, or Firm—David M. Masterson

[57] ABSTRACT

In one aspect of the present invention, a method for generating performance ratings that indicate the driving performance of a vehicle operator is disclosed. The method senses various operating parameters of the vehicle and produces representative signals. Sensed signals are compared to corresponding target values. A plurality of is performance ratings are determined. Finally, an operator summary report illustrating the performance ratings is generated. The report includes recommended actions to improve the performance of the operator.

12 Claims, 4 Drawing Sheets

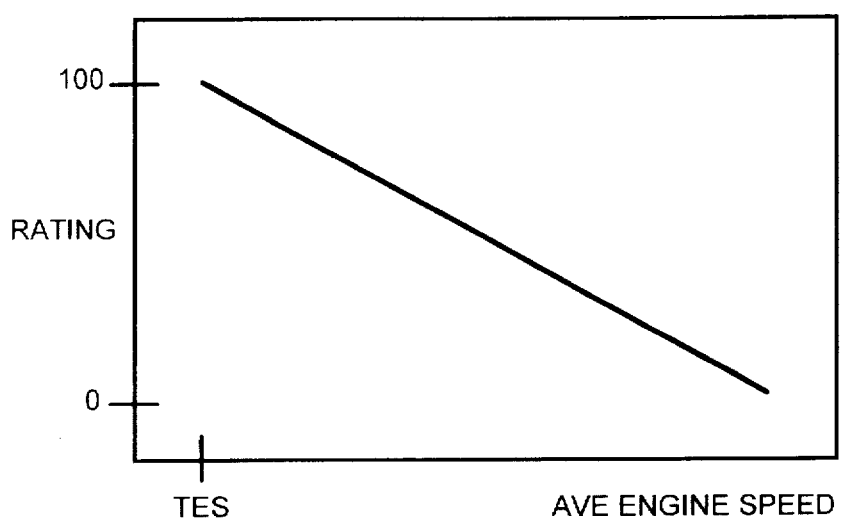
Fig-2-
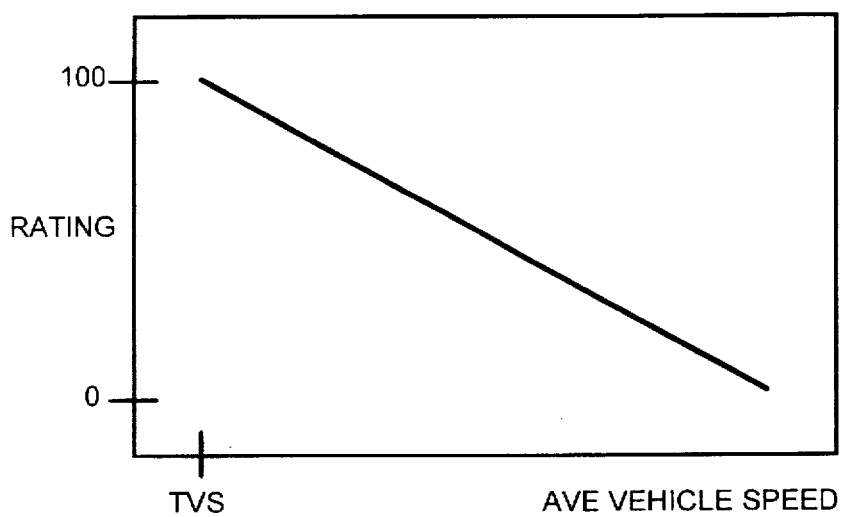
Fig-3-
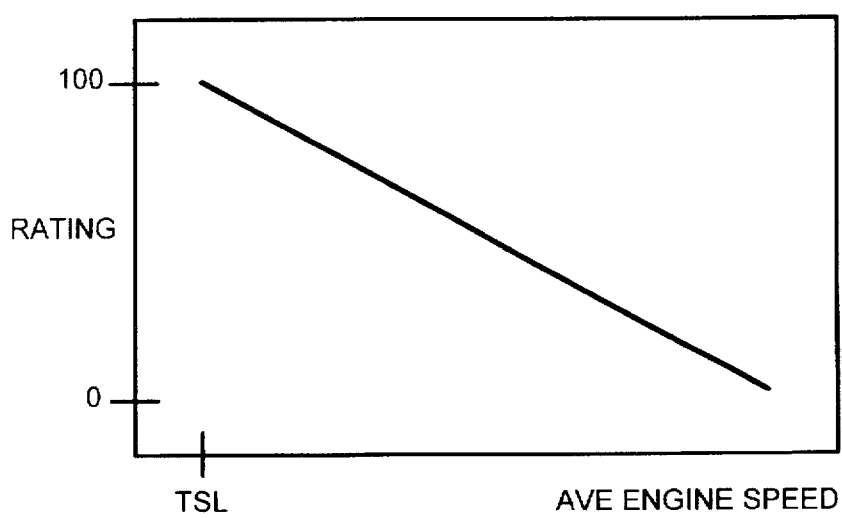
Fig-4-

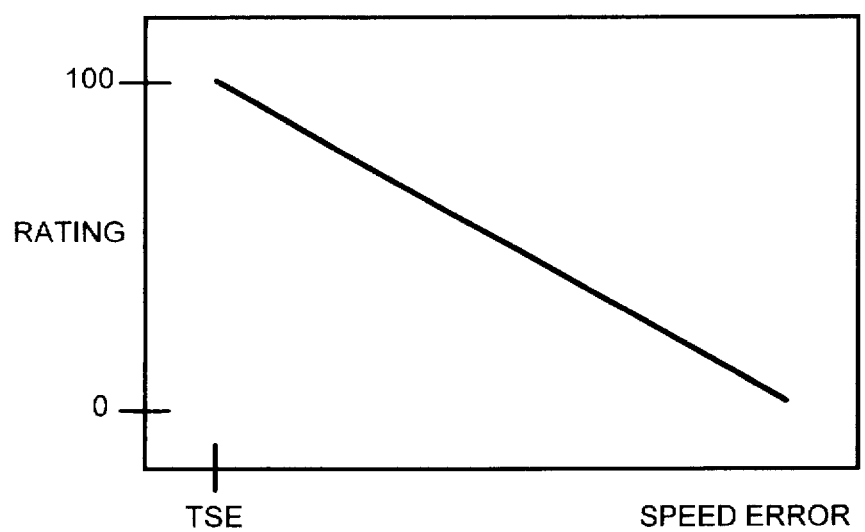
Fig-5-
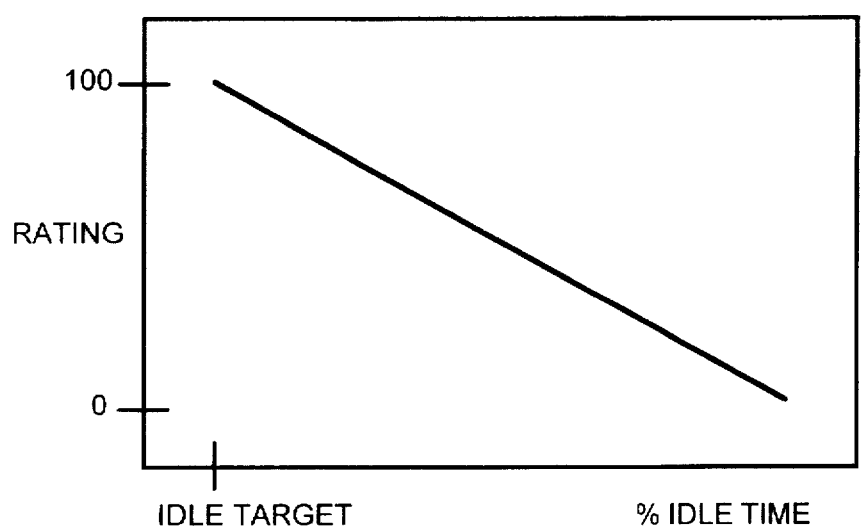
Fig-6-

DRIVER PERFORMANCE SUMMARY REPORT

| TARGET | RATING (ACTUAL) | WEIGHTED RATING | RECOMMENDATIONS | FLEET COMMENTS |
|---|---|---|---|---|
| Engine Speed Target (1500 rpm) | 90 (1535 rpm) | | - upshift as soon as possible | |
| Vehicle Speed Target (45 mph) | 70 (51 mph) | | - fuel penalty = ~0.1 mpg / mph | |
| Shifting Technique (1600 rpm) | 40 (1920 rpm) (18 shifts) | | | |
| Power Demand (50 rpm/sec) | 45 (136 r/s) | | - avoid full throttle (power) as often as possible | |
| Idle Time (20%) | 100 (20%) | | - avoid unnecessary idle time<br>- the engine burns between .75 and 1.5 gal/hr of fuel during idle | |
| Overall Rating | 69 | | | |
| Fuel Economy | 5.9 mpg | | | |

METHOD FOR GENERATING PERFORMANCE RATINGS FOR A VEHICLE OPERATOR

TECHNICAL FIELD

The present invention relates generally to a method of generating performance ratings to indicate the performance of a vehicle operator.

BACKGROUND ART

Heretofore, it had been difficult to train the novice vehicle operator. As skilled vehicle operators become more and more scarce, fleet operators must train more and more novice operators. Traditionally, a skilled operator was required to train a novice operator. However, because the training period occurs over a long time period, it consumes the valuable time of the skilled operator. Consequently, a method is desired to help train the novice vehicle operator in order to maximize the available time of the skilled operator.

The present invention is directed to overcoming one or more of the problems as set forth above.

DISCLOSURE OF THE INVENTION

In one aspect of the present invention, a method for generating performance ratings that indicate the driving performance of a vehicle operator is disclosed. The method senses various operating parameters of the vehicle and produces representative signals. Sensed signals are compared to corresponding target values. A plurality of performance ratings are then determined. Finally, an operator summary report illustrating the performance ratings is generated.

BRIEF DESCRIPTION OF THE DRAWINGS

For a better understanding of the present invention, reference may be made to the accompanying drawings in which:

FIG. 2 illustrates a lookup table associated with an engine speed rating;

FIG. 3 illustrates a lookup table associated with a vehicle speed rating;

FIG. 4 illustrates a lookup table associated with a shifting technique rating;

FIG. 5 illustrates a lookup table associated with a power demand rating;

FIG. 6 illustrates a lookup table associated with an idle time rating; and

FIG. 7 illustrates an operator summary report.

BEST MODE FOR CARRYING OUT THE INVENTION

Figure 1:
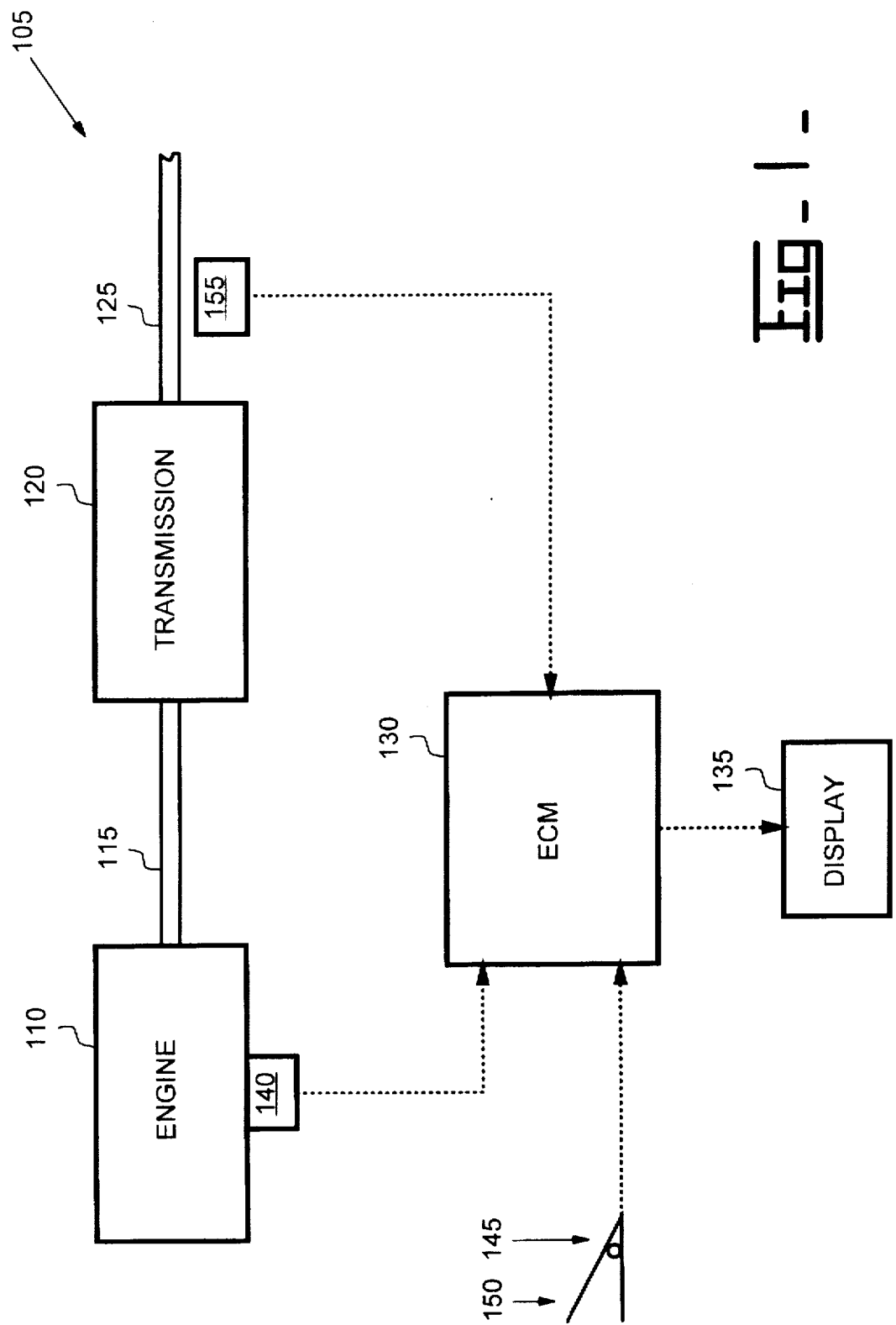
FIG. 1 illustrates an electronic control for a vehicle drive train.

The present invention is directed towards a method of providing fleet managers with information that will assist in the instruction of novice vehicle operators. More particularly, the present invention generates performance ratings for critical operating parameters of the vehicle that indicates the driving performance of the operator.

Referring now to FIG. 1, a vehicle power train 105 is shown. The power train 105 includes an internal combustion engine 110 that rotates an output shaft 115. The output shaft 115 is connected to a multi-speed transmission 120 that has a plurality of interconnected planetary gear sets. The output of the transmission 120 rotates a drive shaft 125 that powers a set of drive wheels (not shown).

An Electronic Control Module 130, hereinafter referred to as the ECM, controls key components of the vehicle power train 105. The ECM is a microprocessor based system which utilizes arithmetic units to control process according to software programs. Typically, the programs are stored in read-only memory, random-access memory or the like. In the preferred embodiment the ECM is a Motorola microcontroller, model no. 68HC11. However, other suitable microcontrollers may be used in connection with the present invention as would be known to one skilled in the art.

In accordance with the present invention, the ECM monitors various vehicle parameters in order to determine the operator's driving performance. These parameters are compared against established target values to determine various performance ratings. These ratings may then be displayed on an LED, LCD, video display, or the like, as indicated by 135. The ratings may also be output to a printer or computer for use at a remote location.

The various monitored vehicle parameters may be read by the several sensors. An engine speed sensor 140 reads the signature of a timing wheel of the engine camshaft and delivers an actual engine speed signal to the ECM to indicate the engine's rotational position and speed. For example, based on the actual engine speed, the ECM will determine an average engine speed. A throttle position sensor 145 senses the position of a throttle 150 and delivers a desired engine speed signal to the ECM to indicate desired engine speed in a manner well known in the art. A vehicle speed sensor 155 senses the rotational speed of the drive shaft 125 and delivers a vehicle speed signal to the ECM to indicate the vehicle's speed of travel. For example, based on the actual vehicle speed, the ECM will determine an average vehicle speed in a manner well known in the art.

The performance ratings will now be discussed.

Engine Speed Rating

The engine speed rating represents the effect of the engine speed on fuel economy. Accordingly, the ECM compares the average engine speed to a target engine speed and determines an engine speed rating. This may be accomplished through a software look-up table, similar to that shown in FIG. 2. The look-up table includes a plurality of engine rating values that correspond to a plurality of engine speed values. The software then selects an engine speed rating in response to the average engine speed. For example, a rating value of one hundred (the highest possible rating) is associated with the average engine speed being equivalent to the target engine speed (TES). As the average engine speed becomes progressively greater than the target engine speed, the rating becomes progressively lower, down to the lowest possible rating of zero. Note that an average engine speed which is equal to or less than the target engine speed will default to an engine speed rating of one hundred.

Preferably, the software look-up table is responsive to the target engine speed, which is a programmable value. As stated above, the target engine speed is assigned to a rating of one hundred. Preferably, the engine speed rating is associated with a fixed slope line beginning with a rating of one hundred and proportionally decreasing down to a rating of zero. Thus, the rating curve is said to be linear.

Note that the slope of each rating curve is a function of the relative impact that the respective rating has on fuel economy.

Consequently, the slope of one rating curve may be different than another. Moreover, a weighting factor could be applied to each rating to better reflect the impact of the respective rating on fuel economy. This would provide for meaningful comparisons of the ratings, and aid in determining an overall rating. Finally, it will be apparent to those skilled in the art that the rating curves may take several shapes including those that are non-linear. It will be further apparent to those skilled in the art that a plurality of empirical equations may likewise be used to determine the particular rating.

Vehicle Speed Rating

The vehicle speed rating represents the effect of the vehicle speed on fuel economy. Accordingly, the ECM compares the average vehicle speed to a target vehicle speed and determines a vehicle speed rating. This may be accomplished through a software look-up table, similar to that shown in FIG. 3.

The look-up table includes a plurality of vehicle speed rating values that correspond to a plurality of vehicle speed values. The software selects a vehicle speed rating in response to the average vehicle speed being greater than the target vehicle speed (TVS). For example, a rating value of one hundred (the highest possible rating) is associated with the average vehicle speed being equivalent to the target vehicle speed. As the average vehicle speed becomes progressively greater than the target vehicle speed, the rating becomes progressively lower, down to the lowest possible rating of zero. Note that an average vehicle speed which is equal to or less than the target vehicle speed will default to a vehicle speed rating of one hundred. Preferably, the software look-up table is responsive to the target vehicle speed, which is a programmable value.

Shifting Technique Rating

The shift technique rating represents the effect of shifting on fuel economy. To this end the ECM determines when a shift has occurred, then records the average engine speed prior to the shift, referred to as the average engine shift speed. The ECM compares the average engine shift speed to a target engine shift speed referred to as a target shift limit (TSL). Based on the difference between the average engine shift speed and the target shift limit, a shift technique rating is determined. This may be accomplished through a software look-up table, similar to that shown in FIG. 4.

The look-up table includes a plurality of shift technique rating values that correspond to a plurality of engine speed values. The software selects a target engine shift speed value in response to average engine shift speed being greater than the target engine shift speed value. For example, a rating value of one hundred (the highest possible rating) is associated with the average engine shift speed being equivalent to the target shift limit. As the average engine shift speed becomes progressively greater than the target shift limit, the rating becomes progressively lower, down to the lowest possible rating of zero. Note that an average engine shift speed which is equal to or less than the target shift limit will default a rating of one hundred. Preferably, the software look-up table is responsive to the target shift limit, which is a programmable value.

In order to determine whether a shift has occurred, the ECM monitors a ratio between the actual engine speed and vehicle speed, just prior to a shift. When the ratio changes by a predetermined amount, then the vehicle is said to have shifted gears. Note, the present invention is only concerned with the effects of upshifting on fuel economy.

Finally, the ECM records the number of shifts that have occurred. Thus, the final shifting technique rating is weighed against a ratio of the number of shifts that have occurred over a predetermined time period to give a better indication of the effect on fuel economy.

Power Demand Rating

The power demand rating represents the effect of the operator's throttle control on fuel economy. For example, the power demand rating is indicative of rapid changes of the throttle position, or in other words, whether the operator is quickly accelerating the vehicle as opposed to gradually accelerating the vehicle. Here, the ECM compares the desired engine speed to the actual engine speed and determines an engine speed error. The speed error is then compared to a target engine speed error (TSE) in order to determine the power demand rating. This may be accomplished through a software look-up table, similar to that shown in FIG. 5.

The look-up table includes a plurality of rating values that correspond to a plurality of engine speed error values. The software selects a power demand rating in response to the engine speed error being greater than the target engine speed error value. For example, a rating value of one hundred (the highest possible rating) is associated is with the engine speed error being equivalent to target engine speed error. As the engine speed error becomes progressively greater than the target engine speed error, the rating becomes progressively lower, down to the lowest possible rating of zero. Note that, the lower the rating value, the greater that the operator's throttle operation is negatively effecting fuel economy.

Idle Time Rating

The idle time rating represents the effects of an idling engine on fuel economy. Accordingly, the ECM determines the percentage of time that the engine is idling to the total time that the engine is running. The idle time percentage is then compared to an idle target to determine the idle time rating. This may be accomplished through a software lookup table, similar to that shown in FIG. 6. The look-up table includes a plurality of rating values that correspond to a plurality of idle time percentage values. The software selects an idle time rating value in response to the idle time percentage being greater than the idle time target. For example, a rating value of one hundred (the highest possible rating) is associated with the idle time percentage being equivalent to the idle target. As the idle time percentage becomes progressively greater than the idle target, the rating becomes progressively lower, down to the lowerst possible rating of zero. Preferably the software look-up table is responsive to the idle target, which is a programmable value.

Thus, while the present invention has been particularly shown and described with reference to the preferred embodiment above, it will be understood by those skilled in the art that various additional embodiments may be contemplated without departing from the spirit and scope of the present invention.

Industrial Applicability

As described, the present invention determines various performance ratings that are indicative of the vehicle operator's effect on fuel efficiency. Advantageously, the present invention provides an operator summary report that includes recommended actions to help improve the operator's performance. An example of such a report is shown with resect to FIG. 7. For example, the report may be displayed in the cab of the vehicle while the operator is driving the vehicle, or the report may be electronically transmitted to a laptop computer for later use.

The report may provide a variety of uses, e.g., to provide continuous improvement of the overall fleet operation to the fleet manager, and also to provide training data for the novice operator.

Additionally, the present invention provides for each of the various targets to be programmable so that fleet manager can customize each performance rating to fit the specific requirements of the fleet.

Other aspects, objects and advantages of the present invention can be obtained from a study of the drawings, the disclosure and the appended claims.

We claim:

1. A method for generating performance ratings to indicate the driving performance of a vehicle operator, the vehicle including a vehicle drive train having an engine that rotates the gears of a transmission, the method including the following steps:

sensing various operating parameters of the vehicle and producing representative signals;

determining a target value for each of the sensed vehicle operating parameters, the target value corresponding to a desired level of operation of a respective vehicle operating parameter;

determining a plurality of performance ratings that correspond to the vehicle operating parameters in response to the difference between the sensed signal magnitudes and the respective target values, the performance ratings representing a level of performance of the vehicle operator with respect to the vehicle operating parameters; and generating an operator summary report of the performance ratings that includes recommendations for improving the performance of the vehicle operator.

2. A method, as set forth in claim 1, including the steps of:

sensing the rotational speed of the engine, and determining the average engine speed from the sensed rotational speeds of the engine.

3. A method, as set forth in claim 2, including the steps of storing a software look-up table including a plurality of engine rating values that correspond to a plurality of engine speed values and selecting an engine speed rating in response to the average engine speed.

4. A method, as set forth in claim 1, including the steps of:

sensing the speed of the vehicle, and determining an average vehicle speed from the sensed speeds of the vehicle.

5. A method, as set forth in claim 4, including the steps of storing a software look-up table including a plurality of vehicle speed rating values that correspond to a plurality of vehicle speed values, and selecting a vehicle speed rating in response to the average vehicle speed.

6. A method, as set forth in claim 1, including the steps of:

sensing the rotational speed of the engine, and determining the actual engine speed from the sensed rotational speed of the engine;

sensing the speed of the vehicle, and determining an actual vehicle speed from the sensed speed of the vehicle;

determining a speed ratio between the actual engine speed and the actual vehicle speed; and determining when a transmission upshift occurs in response to the speed ratio being greater than a predetermined value.

7. A method, as set forth in claim 6, including the steps of determining the average engine speed prior to the upshift.

8. A method, as set forth in claim 7, including the steps of storing a software lookup table including a plurality of shift technique rating values that correspond to a plurality of engine speed values, and selecting a shift technique rating in response to the average engine speed.

9. A method, as set forth in claim 1, including the steps of:

producing a desired engine speed signal;

sensing the rotational speed of the engine, determining an average engine speed from the sensed rotational speeds of the engine and producing an average engine speed signal; and comparing the desired and average engine speed signals and determining an engine speed error.

10. A method, as set forth in claim 9, including the steps of storing a software look-up table including a plurality of rating values that correspond to a plurality of engine speed error values and selecting a power demand rating.

11. A method, as set forth in claim 1, including the step of determining an idle time percentage corresponds to the percentage of time that the engine is idling to the total time that the engine is running.

12. A method, as set forth in claim 11, including the steps of storing in a software look-up table a plurality of idle time rating values that correspond to a plurality of idle time percentage values and selecting an idle time rating value in response to the determined idle time percentage.

* * * * *